United States Patent [19]
McCormick

[11] Patent Number: 5,975,264
[45] Date of Patent: Nov. 2, 1999

[54] ROBOTIC CLUTCH WITH CENTRAL THRUST BEARING

[75] Inventor: Peter E. McCormick, Dallas, Tex.

[73] Assignee: EOA Systems, Inc., Dallas, Tex.

[21] Appl. No.: 09/135,114

[22] Filed: Aug. 17, 1998

Related U.S. Application Data

[60] Provisional application No. 60/083,266, Apr. 27, 1998.
[51] Int. Cl.$^6$ .............................. F16D 23/00; F16D 7/06; F16D 7/04; B25J 19/00
[52] U.S. Cl. ..................................... 192/56.32; 192/56.33; 464/36; 464/38; 901/49
[58] Field of Search .............................. 192/56.31, 56.32, 192/56.33; 464/36, 38, 39; 901/49

[56] References Cited

U.S. PATENT DOCUMENTS

| | | | |
|---|---|---|---|
| 4,311,224 | 1/1982 | Kato et al. | 192/56 R |
| 4,848,546 | 7/1989 | McCormick et al. | 192/56.32 |
| 4,998,606 | 3/1991 | McCormick et al. | 192/56.32 |
| 5,086,901 | 2/1992 | Petronis et al. | 192/56.32 X |
| 5,601,169 | 2/1997 | Wodecki | 192/56.33 |
| 5,626,216 | 5/1997 | Sperling et al. | 464/36 X |
| 5,839,557 | 11/1998 | McCormick | 192/56.32 |

*Primary Examiner*—Charles A. Marmor
*Assistant Examiner*—Roger Pang
*Attorney, Agent, or Firm*—Daniel V. Thompson

[57] ABSTRACT

A robotic clutch with central thrust bearing (10) having a robot adaptor (12) and robotic clutch with central thrust bearing (10) which further has a housing (18) with a housing central opening (18A) therethrough and a housing cavity (18C). The housing (18) further has a housing coupler (18D) in communication with the housing cavity (18C). A toggle breakaway (14) which has a toggle breakaway collar (14F) securely fastened thereto extending downwardly therefrom through the housing central opening (18A). The toggle breakaway (14) is securely connected to the robot adaptor (12). A thrust roller bearing (22) which has a thrust roller bearing central opening (22A) therethrough and a top thrust roller bearing (22T) is circumferentially positioned along an inner surface of the housing top (18T). The thrust roller bearing (22) further has a bottom thrust roller bearing (22B) securely connected to the toggle breakaway collar (14F). An isolation plate (26) which has an isolation plate central dowel (26A) extending upwardly therefrom rotatably positioned through the thrust roller bearing central opening (22A) within the toggle breakaway central opening (14I). The isolation plate (26) is non-rotational during use of the robotic clutch with central thrust bearing (10). A diaphragm (28) is positioned adjacent to and underneath the isolation plate (26). A pressure plate (30) is positioned adjacent to and underneath the diaphragm top (28T). A bottom plate (20) securely connected to the housing (18) having at least one bottom plate air port and at least one bottom plate vacuum port (20F) therethrough in communication with the housing cavity (18C). A biasing means positioned between the bottom plate top indent (20TA) and the pressure plate (30) functioning to maintain the diaphragm (28) in an expanded position.

30 Claims, 3 Drawing Sheets

ROBOTIC CLUTCH WITH CENTRAL THRUST BEARING

CROSS-REFERENCE TO RELATED APPLICATION

This is a non-provisional application based on provisional patent application Ser. No. 60/083,266 filed Apr. 27, 1998.

TECHNICAL FIELD

The present invention relates to a robotic clutch. More particularly, the present invention relates to a robotic clutch with a central thrust bearing.

BACKGROUND OF THE INVENTION

Numerous innovations for robot clutches are present in the prior art. Even though these innovations may be suitable for the specific individual purposes to which they address, they would not be suitable for the purposes of the present invention as heretofore described.

SUMMARY OF THE INVENTION

The present invention relates to a robotic clutch with a central thrust bearing. The robotic clutch is pneumatically powered but alternatively hydraulic pressure may be employed. The major function of the present invention is to avoid extensive damage to robotic instruments or robots that have a malfunction.

INSTALLATION/OPERATION OVERVIEW

The inventor has developed the robotic clutch with central thrust bearing safety mount to provide the user with the ability to protect robot tooling, robots, and assembly fixtures from damage while the robot cell is in operation. The present invention is a safety mount which will automatically pivot and E-Stop the robot upon detection of an overload situation on a robot. The inventor developed the variable sensitivity feature to provide the user with the ability to make the present invention more sensitive when in areas of likely collision without sacrificing robot acceleration.

The present invention attains its variable sensitivity nature through a diaphragm located internal to the device which serves to assist the springs within the clutch. The user can vary the trip point by varying the air pressure on the diaphragm which will vary the spring pressure within The clutch.

When air is not being applied, the springs exert enough force to hold the end effector in place for most tools. This gives the clutch some rigidity and will not trip out due to the weight of the end effector.

The robotic clutch with central thrust bearing is unique because:

A. Uses a diaphragm with high moment carrying capability

B. No air leaks when unit breaks away

C. No O-ring restriction which is necessary for light tooling

D. Allows Z compression direction

E. Isolation plate and thrust roller bearings allow for continuous rotation while not damaging the diaphragm.

The clutch mount of the present invention is a simple device which utilizes air pressure to manipulate an internal diaphragm. Inside the present invention is a cylindrical diaphragm device which has a spring on one side. The effect of placing air pressure through the air port assist the springs thus increasing the moment range. The internal spring will, by spring pressure alone, allow a certain moment. Therefore, the user only need use the air assist option if the load on the tool will exceed the rating shown at 0 psi. The air assist option is designed to give the user maximum protection of heavier end effectors which, by virtue of their mass, are more susceptible to damage in the event of a collision. It is intuitive to reason that by allowing the user to precisely set the trip point at which the the clutch will trip, he will therefore be able to detect an overload condition quicker thus giving the tool better protection.

The present invention is a very simple device to install. Mount the adapter plate provided to a robot wrist. Next, attach the clutch to the adapter plate using the ring provided. Using the connector plug, wire the the clutch switch into the robot E-Stop. The next step is to determine how much moment capacity a user wants the the clutch to accept before breaking away. From the moment calculation a user arrives at a rough estimate as to how much air pressure is the desired moment threshold, with no air pressure (air off) the internal spring constant of the the clutch accepts enough moment to support most small end effectors. As the air pressure increases, the moment rating goes up.

The robotic clutch with central thrust bearing is supplied in 2 versions for light or heavy duty or the clutch 10 and 20. The only difference is that the light duty version has ¼ the springs as the heavy duty so it is more sensitive when using lighter tools.

INSTALLATION

Installation of The clutch is a very straightforward procedure. The user receives the unit fully assembled and executes the following steps to install the present invention on the robot arm:

A. Remove The clutch from the packaging

B. Remove the silver ring clamp which holds the toggle to the robot mounting plate C. Remove the robot adapter plate from the toggle D. Drill out the adapter plate with the robot's pattern. The pattern may have been provided with the pattern already. Bolt the adapter plate to the robot face plate.

E. Mount the clutch to the adapter plate and re-attached the silver ring clamp.

F. Mount a user's tooling to the face of the body of the clutch.

SIGNAL WIRING

The present invention uses 3 normally closed switches to determine the clutch breakaway. Since the circuit is normally closed, the emergency stop relay is "ON" during normal operation. If power is lost, a wire breaks, or if there is a collision, the robot emergency stops when the relay turns off.

REGULATOR INSTALLATION

Normally, a simple manually adjusted single line regulator is used. Mount the regulator in a convenient location. Connect regulated air to the clutch. Dial the corresponding pressure into the regulator to achieve the desired moment capacity.

SETTING SENSITIVITIES

When the robotic clutch with central thrust bearing has been installed, the user can begin to determine which air pressure is needed for the application. The task at hand is to determine those moments likely to be exerted on the present invention and find the corresponding air pressure which protects the end effector during the operation of the robot. To find the proper setting it is recommended the following procedure:

A. Review the fundamental moves of the robot to determine the areas of highest and lowest moment B. Typically the user will find that the highest moment occurs when the robot is accelerating toward and away from the work piece while the lowest moments occur when the robot is working on the part C. Using these as guidelines determine the highest moment when the robot is accelerating rapidly toward or away from the part. Using the moment calculation supplied, a user can determine the moment to be expected when the robot executes these moves D. After the user has determined the moment for this robot refer to a predetermined chart for the air pressure setting which will suit the highest moment the user has calculated E. The present invention is designed to provide the user with maximum flexibility in setting trip points without becoming unduly complicated. The user simply reviews the moments to be found throughout a robot program and finds the optimal setting which is appropriate.

MOMENT CALCULATIONS

Calculating the clutch moment requirements depends upon which direction the robot is moving, and type of wrist movement. Moment is composed of the weight of the end effector and forces due to acceleration. As a worst case, a user can utilize the following formula to calculate moments exerted on the clutch:

$$\text{Moment (in-lb)} = \left(W + \frac{W * A}{384}\right) * D$$

D=distance (inches) from face of The clutch to center of gravity

W=weight (pounds) of end effector and payload standing still

A=maximum acceleration (in/sec$^2$) of robot

384=acceleration of gravity (in/sec$^2$). The fastest robots have approximate accelerations of 700 in/sec$^2$.

SWITCH REPLACEMENT

The present invention uses 3 button switches wired in series. If a user fails to get a signal, make certain that the witness lines scribed on the unit are lined up. The switches do not work if the unit is not at home. If the switches still fails to work, the switches may need to be adjusted or replaced.

The present invention has 200 pounds of spring preload, use a press to relieve pressure while removing the 4 socket headed cap screws.

A. Disconnect air and electrical power

B. Refer to one of the assembly drawings

C. Remove the unit from the robot by removing the silver ring collar

D. Remove the 4 M4 socket headed cap screws from the face of the unit. The lid may need tapping to free the plate from the body due to the precision index pins in the plate E. Remove the seat plate by pulling directly up F. Remove the 4 screws which mate the toggle to the seat plate G. The switches will be exposed. Use an ohmmeter to determine which switch has an open circuit while the user presses down on the switch button H. Replace the bad switch with a new switch assembly I. Test the switches by laying the seat plate back in the unit and pressing down while the witness lines are aligned J. The user feels a 'snap' as all 3 switches work and the ohmmeter should respond. The switches may need to be adjusted in or out radially (but not so much that they are crushed)

K. Replace the toggle, springs and lid. Replace unit on robot

MAINTENANCE

The present invention is designed to operate in the most rugged industrial environments with an absolute minimum of maintenance. It is advised that the user does not attempt to disassemble the present invention other than those steps needed to mount the robotic clutch with central thrust bearing to the robot. The only situation which requires maintenance is if the switch gives a false reading and E-Stops the robot for no apparent reason. If the user is in a situation where the robot is E-Stopping for no apparent reason employ the following steps:

The user checks that the two wires to the switch are working. The connector can be disconnected from the clutch body and the two pins jumpered together to turn the E-STOP relay on.

If this temporary jumper does not turn the relay on, the wire to the robot control is faulty.

It will be understood that each of the elements described above, or two or more together, may also find a useful application in other types of constructions differing from the type described above.

The types of problems encountered in the prior art are robotic clutches are mechanical and lack either pneumatic pressure or a thrust bearing.

In the prior art, unsuccessful attempts to solve this problem were attempted namely: spring loaded clutches. However, the problem was solved by the present invention because it employs pneumatic pressure in conjunction with a thrust bearing.

Innovations within the prior art are rapidly being exploited in the field of robotics.

The present invention went contrary to the teaching of the art which describes and claims mechanical clutches lacking pneumatic pressure and thrust bearings.

The present invention solved a long felt need for an efficient easy to install and mechanically sound robotic clutch.

A synergistic effect was produced utilizing the present invention due to the following facts and results from experimentation: the useful life of a robot was extended as well as minimizing extensive repairs.

Accordingly, it is an object of the present invention to provide a robotic clutch with central thrust bearing having a robot adaptor, toggle breakaway, coupling ring, housing, bottom plate, thrust roller bearing, disk, isolation plate, diaphragm, pressure plate, and spring.

More particularly, it is an object of the present invention to provide the robot adaptor having a robot adaptor central opening, robot adaptor top, robot adaptor bottom, robot adaptor upper flange, robot adaptor grove, robot adaptor lower flange, robot adaptor fastener opening, and robot adaptor dowel opening.

In keeping with these objects, and with others which will become apparent hereinafter, one feature of the present invention resides, briefly stated, in the robot adaptor top comprises a robot adaptor top cap.

When the toggle breakaway is designed in accordance with the present invention, it comprises a toggle breakaway central dowel, toggle breakaway top flange, toggle breakaway groove, toggle breakaway bottom flange, toggle breakaway top, toggle breakaway bottom, toggle breakaway collar, toggle breakaway alignment dowel, toggle breakaway dowel threaded socket, toggle breakaway central opening, and toggle breakaway dowel.

In accordance with another feature of the present invention, the coupling ring comprises a coupling ring fastener, coupling ring top ring, and coupling ring bottom ring.

Another feature of the present invention is that the housing comprises a housing central opening, housing top, housing bottom, housing cavity, housing coupler, housing cylinder, and housing threaded sockets.

Yet another feature of the present invention is that the bottom plate comprises a bottom plate air ports, bottom plate top, bottom plate top indent, bottom plate top recess, bottom plate bottom, bottom plate openings, bottom plate primary tool mounting openings, bottom plate secondary tool mounting openings, and bottom plate vacuum port.

Still another feature of the present invention is that the thrust roller bearing comprises a thrust roller bearing central opening, top thrust roller bearing, bottom thrust roller bearing, bottom thrust roller bearing fasteners, thrust roller bearing dowel openings, thrust roller bearing cylinder, and thrust roller bearing recess.

Yet still another feature of the present invention is that the disk comprises a disk central opening.

Still yet another feature of the present invention is that the isolation plate comprises a isolation plate central dowel and a isolation plate plateau.

Another feature of the present invention is that the diaphragm comprises a diaphragm top, diaphragm bottom lip, and diaphragm side.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—robotic clutch with central thrust bearing (10)
12—robot adaptor (12)
12A—robot adaptor central opening (12A)
12T—robot adaptor top (12T)
12TA—robot adaptor top cap (12TA)
12B—robot adaptor bottom (12B)
12C—robot adaptor upper flange (12C)
12D—robot adaptor grove (12D)
12E—robot adaptor lower flange (12E)
12FA—robot adaptor first fastener opening (12FA)
12FB—robot adaptor second fastener opening (12FB)
12FC—robot adaptor third fastener opening (12FC)
12FD—robot adaptor fourth fastener opening (12FD)
12G—robot adaptor dowel opening (12G)
14—toggle breakaway (14)
14A—toggle breakaway central dowel (14A)
14C—toggle breakaway top flange (14C)
14D—toggle breakaway groove (14D)
14E—toggle breakaway bottom flange (14E)
14T—toggle breakaway top (14T)
14B—toggle breakaway bottom (14B)
14F—toggle breakaway collar (14F)
14G—toggle breakaway alignment dowel (14G)
14HA—toggle breakaway first dowel threaded socket (14HA)
14HB—toggle breakaway second threaded socket (14HB)
14I—toggle breakaway central opening (14I)
14JA—toggle breakaway first dowel (14JA)
14JB—toggle breakaway second dowel (14JB)
16—coupling ring (16)
16A—coupling ring fastener (16A)
16T—coupling ring top ring (16T)
16B—coupling ring bottom ring (16B)
18—housing (18)
18A—housing central opening (18A)
18T—housing top (18T)
18B—housing bottom (18B)
18C—housing cavity (18C)
18D—housing coupler (18D)
18E—housing cylinder (18E)
18FA—housing first threaded socket (18FA)
18FB—housing second threaded socket (18FB)
18FC—housing third threaded socket (18FC)
18FD—housing fourth threaded socket (18FD)
20—bottom plate (20)
20AA—bottom plate first air port (20AA)
20AB—bottom plate second air port (20AB)
20T—bottom plate top (20T)
20TA—bottom plate top indent (20TA)
20TB—bottom plate top recess (20TB)
20B—bottom plate bottom (20B)
20BA—bottom plate bottom recess (20BA)
20CA—bottom plate first opening (20CA)
20CB—bottom plate second opening (20CB)
20CC—bottom plate third opening (20CC)
20CD—bottom plate fourth opening (20CD)
20DA—bottom plate primary tool mounting first opening (20DA)
20DB—bottom plate primary tool mounting second opening (20DB)
20DC—bottom plate primary tool mounting third opening (2ODC)
20DD—bottom plate primary tool mounting fourth opening (20DD)
20EA—bottom plate secondary tool mounting first opening (20EA)
20EB—bottom plate secondary tool mounting second opening (20EB)
20EC—bottom plate secondary tool mounting third opening (20EC)
20ED—bottom plate secondary tool mounting fourth opening (20ED)
20F—bottom plate vacuum port (20F)
22—thrust roller bearing (22)
22A—thrust roller bearing central opening (22A)
22T—top thrust roller bearing (22T)
22B—bottom thrust roller bearing (22B)
22CA—bottom thrust roller bearing first fastener (22CA)
22CB—bottom thrust roller bearing second fastener (22CB)
22DA—thrust roller bearing fir st dowel opening (22DA)
22DB—thrust roller bearing second dowel opening (22DB)
22E—thrust roller bearing cylinder (22E)
22F—thrust roller bearing recess (22F)
24—disk (24)
24A—disk central opening (24A)
26—isolation plate (26)
26A—isolation plate central dowel (26A)
26B—isolation plate plateau (26B)
28—diaphragm (28)
28T—diaphragm top (28T)
28B—diaphragm bottom lip (28B)
28A—diaphragm side (28A)

30—pressure plate (30)
32—spring (32)
34A—first housing fastener (34A)
34AA—first housing fastener washer (34AA)
34B—second housing fastener (34B)
34BA—second housing fastener washer (34BA)
34C—third housing fastener (34C)
34CA—third housing fastener washer (34CA)
34D—fourth housing fastener (34D)
34DA—ourth housing fastener washer (34DA)
36A—first robot fastener (36A)
36B3—second robot fastener (3613)
36C—third robot fastener (36C)
36D—fourth robot fastener (36D)

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
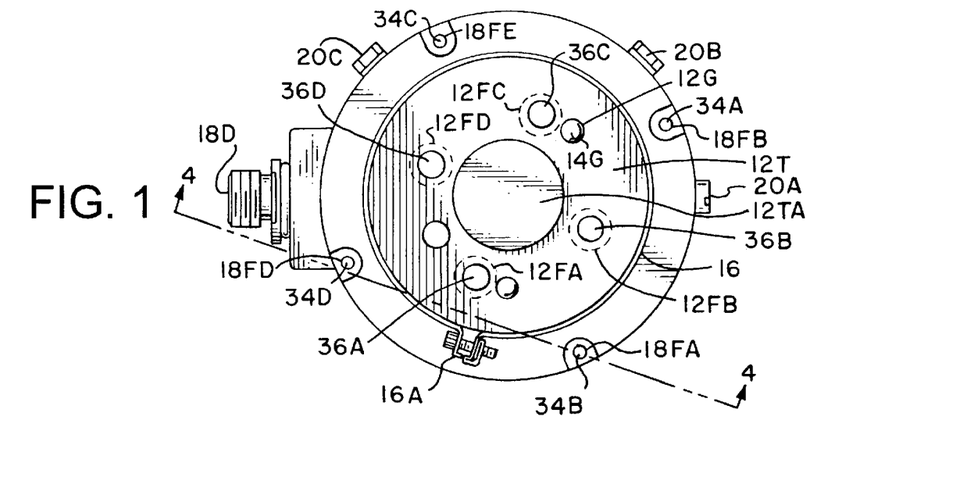
FIG. 1 is a top view of a robotic clutch with central thrust bearing.
Figure 2:
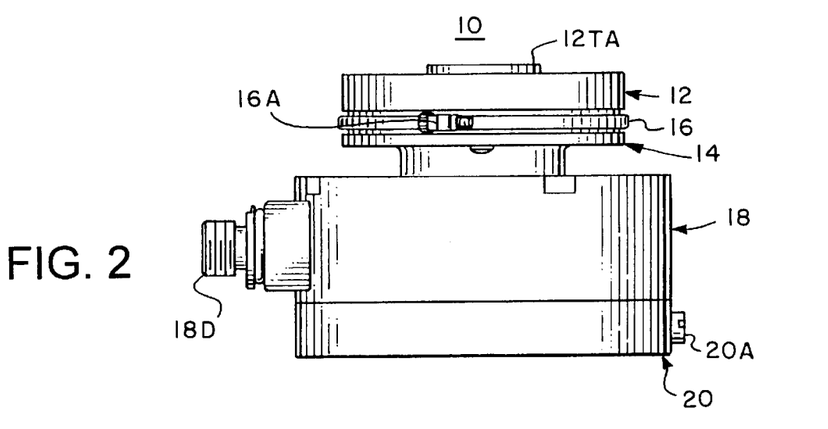
FIG. 2 is a side view of a robotic clutch with central thrust bearing.
Figure 3:
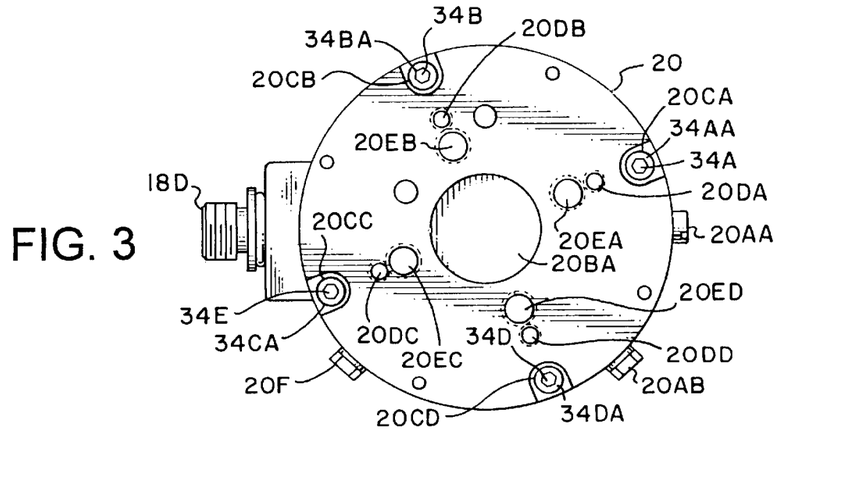
FIG. 3 is a bottom view of a robotic clutch with central thrust bearing.
Figure 4:
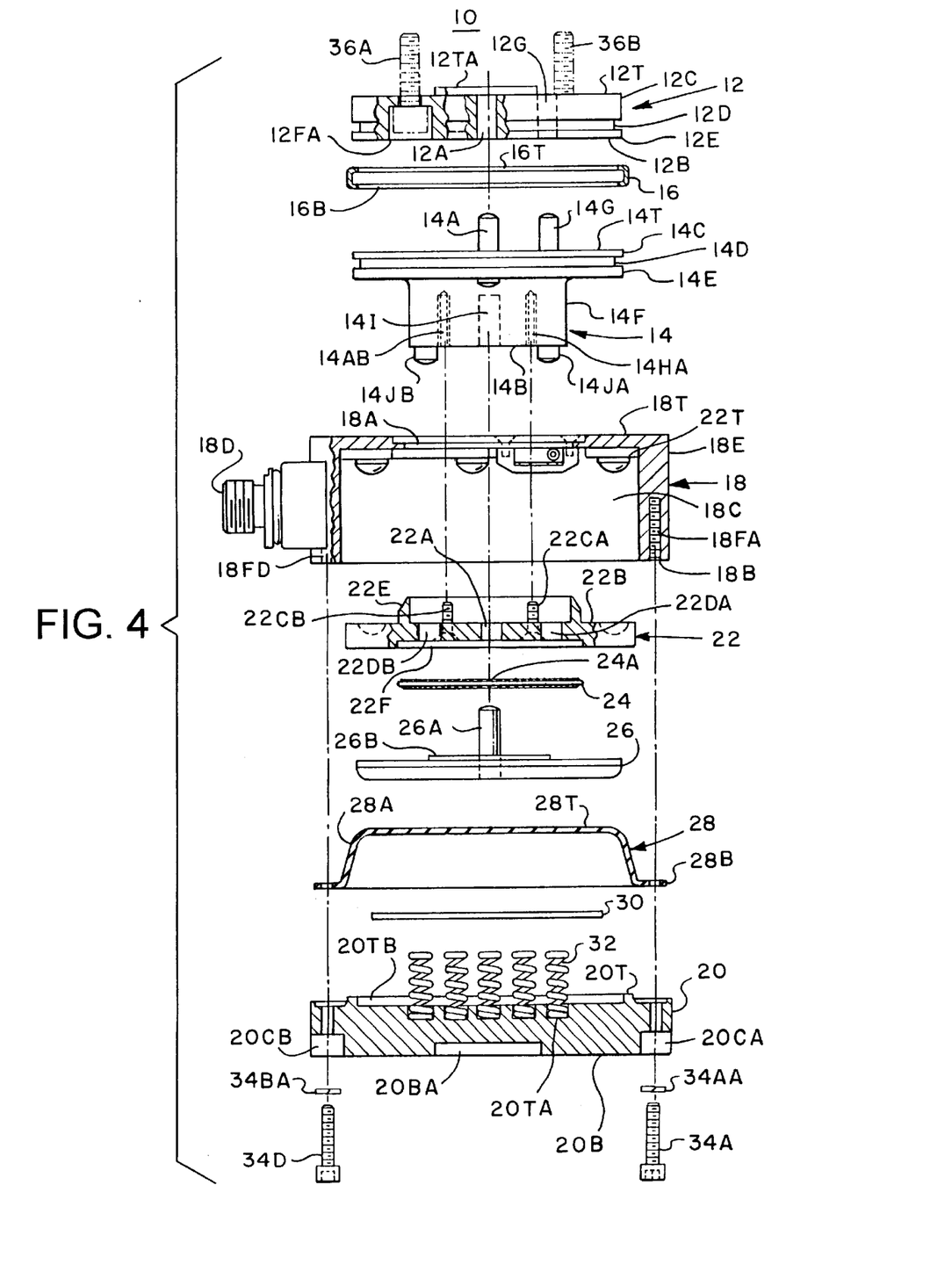
FIG. 4 is an exploded cross sectional view of a robotic clutch with central thrust bearing along line 4—4 of FIG. 1.

Firstly, referring to FIG. 1, FIG. 2, and FIG. 3 which are top, side, and bottom views, respectively, of a robotic clutch with central thrust bearing (10) and FIG. 4 which is an exploded cross sectional view of a robotic clutch with central thrust bearing (10) along line 4—4 of FIG. 1. The robotic clutch with central thrust bearing (10) comprises a robot adaptor (12) which comprises a robot adaptor top (12T) and a robot adaptor bottom (12B). The robot adaptor (12) further comprises a robot adaptor central opening (12A). The toggle breakaway (14) further comprises a toggle breakaway central dowel (14A) engagably positioned in the robot adaptor central opening (12A). The robot adaptor (12) further comprises a robot adaptor upper flange (12C) positioned on the robot adaptor bottom (12B). The robot adaptor upper flange (12C) is separated from a robot adaptor lower flange (12E) by a robot adaptor grove (12D). The toggle breakaway (14) further comprises a toggle breakaway top flange (14C) positioned on the toggle breakaway top (14T). The toggle breakaway top flange (14C) is separated from a toggle breakaway bottom flange (14E) by a toggle breakaway groove (14D). A coupling ring (16) which comprises a coupling ring top ring (16T) which engagably mounts within the robot adaptor grove (12D). The coupling ring (16) further comprises a coupling ring bottom ring (16B) which engagably mounts within the toggle breakaway groove (14D). The coupling ring (16) further comprises a coupling ring fastener (16A) which functions as a tightening means. The coupling ring (16) functions to securely attach the robot adaptor (12) to the toggle breakaway (14). The robot adaptor (12) further comprises at least one robot adaptor first fastener opening (12FA). A robot fastener is positioned through the at least one robot adaptor first fastener opening (12FA) extending upwardly from the robot adaptor top (12T). The robot adaptor (12) further comprises at least one robot adaptor dowel opening (12G) therethrough. The robot adaptor (12) further comprises a robot adaptor top cap (12TA) positioned over the robot adaptor central opening (12A) functioning to prevent debris fro entering therein. The robot adaptor (12) further comprises a robot adaptor first fastener opening (12FA) having a first robot fastener (36A) positioned therethrough extending upwardly, and a robot adaptor second fastener opening (12FB) having a second robot fastener (36B) positioned therethrough extending upwardly and a robot adaptor third fastener opening (12FC) having a third robot fastener (36C) positioned therethrough extending upwardly and a robot adaptor fourth fastener opening (12FD) having a fourth robot fastener (36D) positioned therethrough extending upwardly.

The toggle breakaway (14) further comprises at least one toggle breakaway alignment dowel (14G) engagably positioned in the at least one robot adaptor dowel opening (12G). The toggle breakaway (14) further comprises at least one toggle breakaway dowel threaded socket therein extending upwardly from the toggle breakaway bottom (14B). The toggle breakaway (14) further comprises at least one toggle breakaway dowel extending downwardly from the toggle breakaway bottom (14B). The at least one toggle breakaway dowel threaded socket are a toggle breakaway first dowel threaded socket (14HA) in which a bottom thrust roller bearing first fastener (22CA) engages and a toggle breakaway first dowel threaded socket (14HA) in which bottom thrust roller bearing second fastener (22CB) engages.

The robotic clutch with central thrust bearing (10) further comprises a housing (18) which comprises a housing central opening (18A) therethrough and a housing top (18T) and an open housing bottom (18B) and a housing cylinder (18E) defining a housing cavity (18C) therein. The housing (18) further comprises a housing coupler (18D) in communication with the housing cavity (18C). The housing (18) further comprises at least one housing threaded socket therein extending upwardly from the housing bottom (18B). The bottom plate (20) further comprises at least one bottom plate opening therethrough having a housing fastener positioned therethrough engaging the at least one housing threaded socket. The housing cylinder (18E) comprises at least one housing threaded socket therein extending upwardly from a bottom surface thereof. The bottom plate (20) further comprises at least one complimentary positioned bottom plate opening through which a housing fastener is positioned engaging the at least one housing threaded socket. The at least one housing threaded socket comprises a housing first threaded socket (18FA) and a housing second threaded socket (18FB) and a housing third threaded socket (18FC) and housing fourth threaded socket (18FD). The at least one complimentary positioned bottom plate opening comprises a bottom plate first opening (20CA) and a bottom plate second opening (20CB) and a bottom plate third opening (20CC) and a bottom plate fourth opening (20CD). A first housing fastener (34A) is positioned through the bottom plate first opening (20CA) engaging the housing first threaded socket (18FA) and a second housing fastener (34B) is positioned through the bottom plate second opening (20CB) engaging the housing second threaded socket (18FB) and a third housing fastener (34C) is positioned through the bottom plate third opening (20CC) engaging the housing third threaded socket (18FC) and a fourth housing fastener (34D) is positioned through the bottom plate fourth opening (20DA) engaging the housing fourth threaded socket (18FD). The first housing fastener (34A) comprises a first housing fastener washer (34AA) thereon and the second housing fastener (34B) comprises a second housing fastener washer (34BA) thereon and the third housing fastener (34C) comprises a third housing fastener washer (34CA) thereon and the fourth housing fastener (34D) comprises a fourth housing fastener washer (34DAA) thereon.

The robotic clutch with central thrust bearing (10) further comprises a toggle breakaway (14) which comprises a toggle breakaway top (14T) and a toggle breakaway bottom (14B) having a toggle breakaway collar (14F) securely fastened thereto extending downwardly therefrom through the housing central opening (18A). The toggle breakaway (14) is securely connected to the robot adaptor (12). The toggle breakaway (14) further comprises a toggle breakaway central opening (14I) therein extending upwardly from the toggle breakaway bottom (14B).

The robotic clutch with central thrust bearing (10) further comprises a thrust roller bearing (22) which comprises a thrust roller bearing central opening (22A) therethrough and a top thrust roller bearing (22T) circumferentially positioned along an inner surface of the housing top (18T). The thrust roller bearing (22) further comprises a bottom thrust roller bearing (22B) securely connected to the toggle breakaway collar (14F). The thrust roller bearing (22) further comprises a thrust roller bearing cylinder (22E) extending upwardly therefrom. The thrust roller bearing cylinder (22E) comprises a slightly larger diameter than a diameter of the toggle breakaway collar (14F) within which the thrust roller bearing cylinder (22E) is positioned. The thrust roller bearing (22) further comprises at least one thrust roller bearing dowel opening therethrough. The bottom thrust roller bearing (22B) comprises at least one bottom thrust roller bearing fastener. The thrust roller bearing (22) further comprises at least one thrust roller bearing dowel opening therethrough in which a toggle breakaway dowel (14JA) is positioned. The thrust roller bearing (22) further comprises a thrust roller bearing first dowel opening (22DA) therethrough in which a toggle breakaway first dowel (14JA) is positioned therein and a thrust roller bearing second dowel opening (22DB) therethrough in which a toggle breakaway second dowel (14JB) is positioned therein.

The robotic clutch with central thrust bearing (10) further comprises a disk (24) having a disk central opening (24A) positioned between the thrust roller bearing (22) and the isolation plate (26). The disk (24) functions to allow the thrust roller bearing (22) to rotate while the isolation plate (26) remains in place. The thrust roller bearing (22) further comprises a thrust roller bearing recess (22F) positioned in a bottom thereof having a slightly larger diameter than an outer diameter of the disk (24) which is positioned therein, the isolation plate (26) further comprises a isolation plate plateau (26B) extending upwardly therefrom having a diameter slightly less than a diameter of the disk central opening (24A).

The robotic clutch with central thrust bearing (10) further comprises an isolation plate (26) which comprises a isolation plate central dowel (26A) extending upwardly therefrom rotatably positioned through the thrust roller bearing central opening (22A) within the toggle breakaway central opening (14I). The isolation plate (26) is non-rotational during use of the robotic clutch with central thrust bearing (10)

The robotic clutch with central thrust bearing (10) further comprises a diaphragm (28) which comprises a diaphragm top (28T) connected to a diaphragm bottom lip (28B) extending horizontally therefrom by a diaphragm side (28A). The diaphragm top (28T) is positioned adjacent to and underneath the isolation plate (26).

The robotic clutch with central thrust bearing (10) further comprises a pressure plate (30) is positioned adjacent to and underneath the diaphragm top (28T).

The robotic clutch with central thrust bearing (10) further comprises a bottom plate (20) securely connected to the housing (18). The bottom plate (20) comprises at least one bottom plate air port and at least one bottom plate vacuum port (20F) therethrough in communication with the housing cavity (18C). The bottom plate (20) further comprises a bottom plate top (20T) and a bottom plate bottom (20B). The bottom plate bottom (20B) further comprises a bottom plate bottom recess (20BA). The bottom plate bottom (20B) further comprises at least one bottom plate primary tool mounting opening therein. The at least one bottom plate primary tool mounting opening comprises a bottom plate primary tool mounting first opening (20DA) and a bottom plate primary tool mounting second opening (20DB) and a bottom plate primary tool mounting third opening (20DC) and a bottom plate primary tool mounting fourth opening (20DD). The bottom plate bottom (20B) further comprises at least one bottom plate secondary tool mounting opening therein. The at least one bottom plate secondary tool mounting opening comprises a bottom plate secondary tool mounting first opening (20EA) and a bottom plate secondary tool mounting second opening (20EB) and a bottom plate secondary tool mounting third opening (20EC) and a bottom plate secondary tool mounting fourth opening (20ED).

The bottom plate top (20T) further comprises a bottom plate top recess (20TB) having a diameter slightly larger than an outer diameter of the pressure plate (30). The diaphragm bottom lip (28B) is sealably positioned between a bottom of the housing cylinder (18E) and an outer periphery of the bottom plate (20). The bottom plate (20) further comprises a bottom plate top (20T) having at least one bottom plate top indent (20TA) therein and a bottom plate bottom (20B). A spring (32) is positioned between the bottom plate top indent (20TA) and the pressure plate (30) functioning as a biasing means maintaining the diaphragm (28) in an expanded position.

The robotic clutch with central thrust bearing (10) further comprises a biasing means positioned between the bottom plate top indent (20TA) and the pressure plate (30) functioning to maintain the diaphragm (28) in an expanded position. When air enters through the at least one bottom plate air port, the diaphragm (28) expands and concurrently, the diaphragm top (28T) applies pressure to the isolation plate (26) which in turn applies pressure to the toggle breakaway (14) and the robot adaptor (12) pushing upwardly engaging the robotic clutch with central thrust bearing (10). When vacuum is applied to through the at least one bottom plate vacuum port (20F), the diaphragm (28) collapses and concurrently, the diaphragm top (28T) releases from the isolation plate (26) which in reduces pressure to the toggle breakaway (14) and the robot adaptor (12) pulling upwardly disengaging the robotic clutch with central thrust bearing (10).

Figure 5:
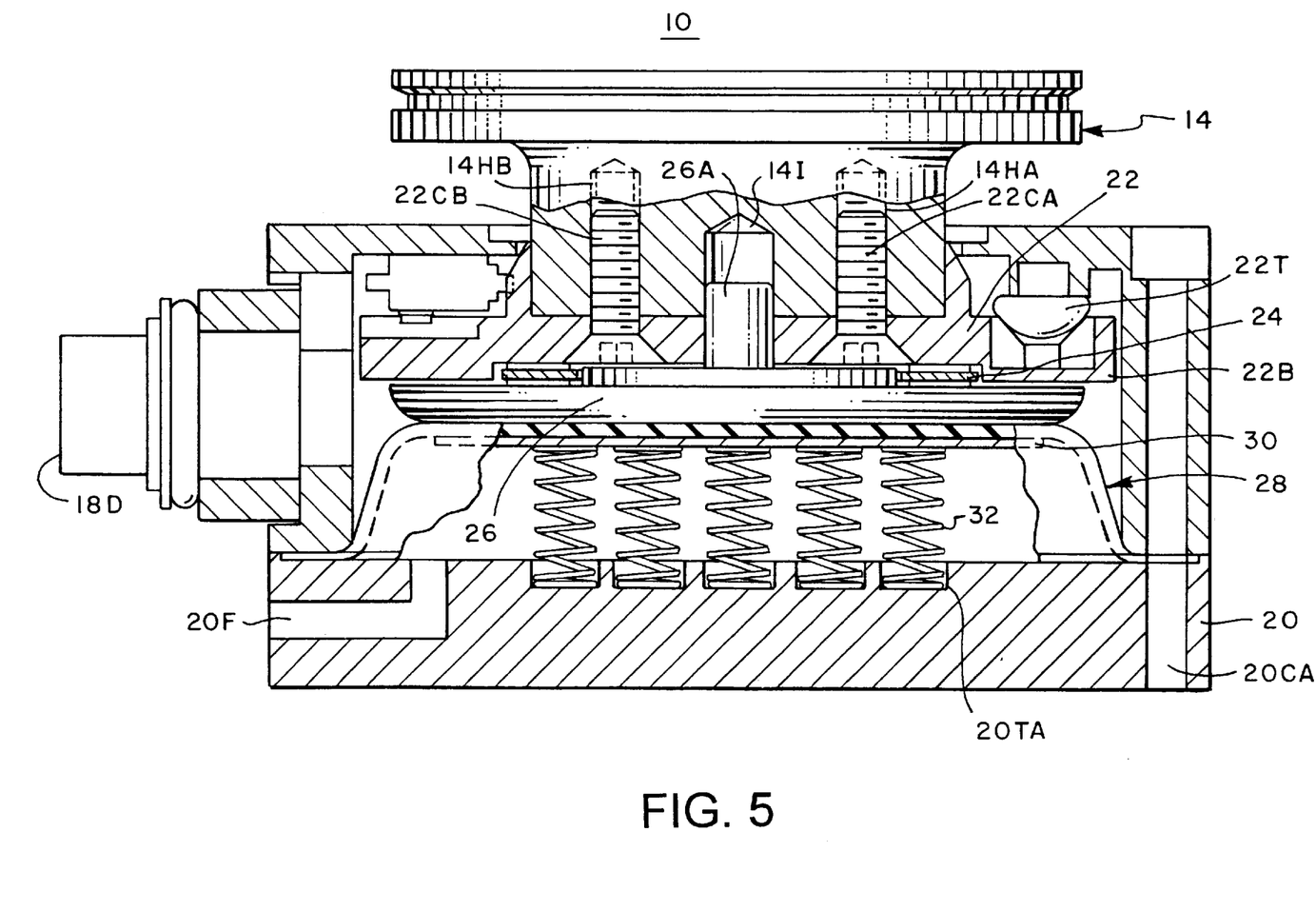
FIG. 5 is a cross sectional view of a robotic clutch with central thrust bearing.

Lastly referring to FIG. 5 which is a cross sectional view of a robotic clutch with central thrust bearing (10). The at least one bottom plate air port comprises a bottom plate first air port (20AA) and a bottom plate second air port (20AB).

While the invention has been illustrated and described as embodied in a robotic clutch, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so filly reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A robotic clutch with central thrust bearing (10) comprising:

A) a robot adaptor (12) which comprises a robot adaptor top (12T) and a robot adaptor bottom (12B);

B) a housing (18) which comprises a housing central opening (18A) therethrough and a housing top (18T) and an open housing bottom (18B) and a housing cylinder (18E) defining a housing cavity (18C) therein, the housing (18) further comprises a housing coupler (18D) in communication with the housing cavity (18C);

C) a toggle breakaway (14) which comprises a toggle breakaway top (14T) and a toggle breakaway bottom (14B) having a toggle breakaway collar (14F) securely fastened thereto extending downwardly therefrom through the housing central opening (18A), the toggle breakaway (14) is securely connected to the robot adaptor (12), the toggle breakaway (14) further comprises a toggle breakaway central opening (14I) therein extending upwardly from the toggle breakaway bottom (14B);

D) a thrust roller bearing (22) which comprises a thrust roller bearing central opening (22A) therethrough and a top thrust roller bearing (22T) circumferentially positioned along an inner surface of the housing top (18T), the thrust roller bearing (22) further comprises a bottom thrust roller bearing (22B) securely connected to the toggle breakaway collar (14F);

F) an isolation plate (26) which comprises a isolation plate central dowel (26A) extending upwardly therefrom rotatably positioned through the thrust roller bearing central opening (22A) within the toggle breakaway central opening (14I), the isolation plate (26) is non-rotational during use of the robotic clutch with central thrust bearing (10);

G) a diaphragm (28) which comprises a diaphragm top (28T) connected to a diaphragm bottom lip (28B) extending horizontally therefrom by a diaphragm side (28A), the diaphragm top (28T) is positioned adjacent to and underneath the isolation plate (26);

H) a pressure plate (30) is positioned adjacent to and underneath the diaphragm top (28T);

I) a bottom plate (20) securely connected to the housing (18), the bottom plate (20) comprises at least one bottom plate air port and at least one bottom plate vacuum port (20F) therethrough in communication with the housing cavity (18C), the bottom plate (20) further comprises a bottom plate top (20T) and a bottom plate bottom (20B), the diaphragm bottom lip (28B) is sealably positioned between a bottom of the housing cylinder (18E) and an outer periphery of the bottom plate (20); and J) a biasing means positioned between a bottom plate top indent (20TA) and the pressure plate (30) functioning to maintain the diaphragm (28) in an expanded position, when air enters through the at least one bottom plate air port, the diaphragm (28) expands and concurrently, the diaphragm top (28T) applies pressure to the isolation plate (26) which in turn applies pressure to the toggle breakaway (14) and the robot adaptor (12) pushing upwardly engaging the robotic clutch with central thrust bearing (10), when vacuum is applied to through the at least one bottom plate vacuum port (20F), the diaphragm (28) collapses and concurrently, the diaphragm top (28T) releases from the isolation plate (26) which in reduces pressure to the toggle breakaway (14) and the robot adaptor (12) pulling upwardly disengaging the robotic clutch with central thrust bearing (10).

2. The robotic clutch with central thrust bearing (10) as described in claim 1, wherein the robot adaptor (12) further comprises a robot adaptor central opening (12A), the toggle breakaway (14) further comprises a toggle breakaway central dowel (14A) engagably positioned in the robot adaptor central opening (12A).

3. The robotic clutch with central thrust bearing (10) as described in claim 1, wherein the robot adaptor (12) further comprises a robot adaptor upper flange (12C) positioned on the robot adaptor bottom (12B), the robot adaptor upper flange (12C) is separated from a robot adaptor lower flange (12E) by a robot adaptor grove (12D), the toggle breakaway (14) further comprises a toggle breakaway top flange (14C) positioned on the toggle breakaway top (14T), the toggle breakaway top flange (14C) is separated from a toggle breakaway bottom flange (14E) by a toggle breakaway groove (14D), a coupling ring (16) which comprises a coupling ring top ring (16T) which engagably mounts within the robot adaptor grove (12D), the coupling ring (16) further comprises a coupling ring bottom ring (16B) which engagably mounts within the toggle breakaway groove (14D), the coupling ring (16) functions to securely attach the robot adaptor (12) to the toggle breakaway (14).

4. The robotic clutch with central thrust bearing (10) as described in claim 1, wherein the robot adaptor (12) further comprises at least one robot adaptor first fastener opening (12FA), a robot fastener is positioned through the at least one robot adaptor first fastener opening (12FA) extending upwardly from the robot adaptor top (12T).

5. The robotic clutch with central thrust bearing (10) as described in claim 1, wherein the robot adaptor (12) further comprises at least one robot adaptor dowel opening (12G) therethrough, the toggle breakaway (14) further comprises at least one toggle breakaway alignment dowel (14G) engagably positioned in the at least one robot adaptor dowel opening (12G).

6. The robotic clutch with central thrust bearing (10) as described in claim 1, wherein the toggle breakaway (14) further comprises at least one toggle breakaway dowel threaded socket therein extending upwardly from the toggle breakaway bottom (14B).

7. The robotic clutch with central thrust bearing (10) as described in claim 1, wherein the toggle breakaway (14) further comprises at least one toggle breakaway dowel extending downwardly from the toggle breakaway bottom (14B).

8. The robotic clutch with central thrust bearing (10) as described in claim 1, wherein the thrust roller bearing (22) further comprises a thrust roller bearing cylinder (22E) extending upwardly therefrom, the thrust roller bearing cylinder (22E) comprises a slightly larger diameter than a diameter of the toggle breakaway collar (14F) within which the thrust roller bearing cylinder (22E) is positioned.

9. The robotic clutch with central thrust bearing (10) as described in claim 1, wherein the thrust roller bearing (22) further comprises at least one thrust roller bearing dowel opening therethrough.

10. The robotic clutch with central thrust bearing (10) as described in claim 1, wherein the bottom thrust roller bearing (22B) comprises at least one bottom thrust roller bearing fastener.

11. The robotic clutch with central thrust bearing (10) as described in claim 1, wherein the bottom plate (20) further comprises a bottom plate top (20T) having at least one bottom plate top indent (20TA) therein and a bottom plate bottom (20B), a spring (32) is positioned between the bottom plate top indent (20TA) and the pressure plate (30) functioning as a biasing means maintaining the diaphragm (28) in an expanded position.

12. The robotic clutch with central thrust bearing (10) as described in claim 1, wherein the housing (18) further comprises at least one housing threaded socket therein extending upwardly from the housing bottom (18B), the bottom plate (20) further comprises at least one bottom plate opening therethrough having a housing fastener positioned therethrough engaging the at least one housing threaded socket.

13. The robotic clutch with central thrust bearing (10) as described in claim 1, wherein the robot adaptor (12) further comprises a robot adaptor top cap (12TA) positioned over the robot adaptor central opening (12A) functioning to prevent debris fro entering therein.

14. The robotic clutch with central thrust bearing (10) as described in claim 1, wherein the robot adaptor (12) further comprises a robot adaptor first fastener opening (12FA) having a first robot fastener (36A) positioned therethrough extending upwardly, and a robot adaptor second fastener opening (12FB) having a second robot fastener (36B) positioned therethrough extending upwardly and a robot adaptor third fastener opening (12FC) having a third robot fastener (36C) positioned therethrough extending upwardly and a robot adaptor fourth fastener opening (12FD) having a fourth robot fastener (36D) positioned therethrough extending upwardly.

15. The robotic clutch with central thrust bearing (10) as described in claim 1, wherein an at least one toggle breakaway dowel threaded socket are a toggle breakaway first dowel threaded socket (14HA) in which a bottom thrust roller bearing first fastener (22CA) engages and a toggle breakaway second dowel threaded socket (14HB) in which a bottom thrust roller bearing second fastener (22CB) engages.

16. The robotic clutch with central thrust bearing (10) as described in claim 1, wherein the thrust roller bearing (22) further comprises at least one thrust roller bearing dowel opening therethrough in which a toggle breakaway dowel (14JA) is positioned.

17. The robotic clutch with central thrust bearing (10) as described in claim 16, wherein the thrust roller bearing (22) further comprises a thrust roller bearing first dowel opening (22DA) therethrough in which a toggle breakaway first dowel (14JA) is positioned therein and a thrust roller bearing second dowel opening (22DB) therethrough in which a toggle breakaway second dowel (14JB) is positioned therein.

18. The robotic clutch with central thrust bearing (10) as described in claim 1, further comprises a disk (24) having a disk central opening (24A) positioned between the thrust roller bearing (22) and the isolation plate (26), the disk (24) functions to allow the thrust roller bearing (22) to rotate while the isolation plate (26) remains in place.

19. The robotic clutch with central thrust bearing (10) as described in claim 1, wherein the thrust roller bearing (22) further comprises a thrust roller bearing recess (22F) positioned in a bottom thereof having a slightly larger diameter than an outer diameter of a disk (24) which is positioned therein, the isolation plate (26) further comprises a isolation plate plateau (26B) extending upwardly therefrom having a diameter slightly less than a diameter of a disk central opening (24A).

20. The robotic clutch with central thrust bearing (10) as described in claim 3, wherein the coupling ring (16) further comprises a coupling ring fastener (16A) which functions as a tightening means.

21. The robotic clutch with central thrust bearing (10) as described in claim 1, wherein the housing cylinder (18E) comprises at least one housing threaded socket therein extending upwardly from a bottom surface thereof, the bottom plate (20) further comprises at least one complimentary positioned bottom plate opening through which a housing fastener is positioned engaging the at least one housing threaded socket.

22. The robotic clutch with central thrust bearing (10) as described in claim 21, wherein the at least one housing threaded socket comprises a housing first threaded socket (18FA) and a housing second threaded socket (18FB) and a housing third threaded socket (18FC) and housing fourth threaded socket (18FD), the at least one complimentary positioned bottom plate opening comprises a bottom plate first opening (20CA) and a bottom plate second opening (20CB) and a bottom plate third opening (20CC) and a bottom plate fourth opening (20CD), a first housing fastener (34A) is positioned through the bottom plate first opening (20CA) engaging the housing first threaded socket (18FA) and a second housing fastener (34B) is positioned through the bottom plate second opening (20CB) engaging the housing second threaded socket (18FB) and a third housing fastener (34C) is positioned through the bottom plate third opening (20CC) engaging the housing third threaded socket (18FC) and a fourth housing fastener (34D) is positioned through the bottom plate fourth opening (20DA) engaging the housing fourth threaded socket (18FD).

23. The robotic clutch with central thrust bearing (10) as described in claim 22, wherein the first housing fastener (34A) comprises a first housing fastener washer (34AA) thereon and the second housing fastener (34A) comprises a second housing fastener washer (34BA) thereon and the third housing fastener (34C) comprises a third housing fastener washer (34CA) thereon and the fourth housing fastener (34D) comprises a fourth housing fastener washer (34DAA) thereon.

24. The robotic clutch with central thrust bearing (10) as described in claim 1, wherein the at least one bottom plate air port comprises a bottom plate first air port (20AA) and a bottom plate second air port (20AB).

25. The robotic clutch with central thrust bearing (10) as described in claim 1, wherein the bottom plate top (20T) further comprises a bottom plate top recess (20TB) having a diameter slightly larger than an outer diameter of the pressure plate (30).

26. The robotic clutch with central thrust bearing (10) as described in claim 1, wherein the bottom plate bottom (20B) further comprises a bottom plate bottom recess (20BA).

27. The robotic clutch with central thrust bearing (10) as described in claim 1, wherein the bottom plate bottom (20B) further comprises at least one bottom plate primary tool mounting opening therein.

28. The robotic clutch with central thrust bearing (10) as described in claim 27, wherein the at least one bottom plate primary tool mounting opening comprises a bottom plate primary tool mounting first opening (20DA) and a bottom plate primary tool mounting second opening (20DB) and a bottom plate primary tool mounting third opening (20DC) and a bottom plate primary tool mounting fourth opening (20DD).

29. The robotic clutch with central thrust bearing (10) as described in claim 1, wherein the bottom plate bottom (20B) further comprises at least one bottom plate secondary tool mounting opening therein.

30. The robotic clutch with central thrust bearing (10) as described in claim 29, wherein the at least one bottom plate secondary tool mounting opening comprises a bottom plate secondary tool mounting first opening (20EA) and a bottom plate secondary tool mounting second opening (20EB) and a bottom plate secondary tool mounting third opening (20EC) and a bottom plate secondary tool mounting fourth opening (20ED).

* * * * *